US011705119B2

(12) United States Patent
Kudo

(10) Patent No.: US 11,705,119 B2
(45) Date of Patent: Jul. 18, 2023

(54) GUIDE VOICE OUTPUT CONTROL SYSTEM AND GUIDE VOICE OUTPUT CONTROL METHOD

(71) Applicant: ALPINE ELECTRONICS, INC., Tokyo (JP)

(72) Inventor: Nobunori Kudo, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 297 days.

(21) Appl. No.: 16/701,494

(22) Filed: Dec. 3, 2019

(65) Prior Publication Data
US 2020/0184971 A1 Jun. 11, 2020

(30) Foreign Application Priority Data

Dec. 6, 2018 (JP) .................................. 2018-228948

(51) Int. Cl.
*G10L 15/22* (2006.01)
*B60K 35/00* (2006.01)
*G06F 3/16* (2006.01)

(52) U.S. Cl.
CPC .............. *G10L 15/22* (2013.01); *B60K 35/00* (2013.01); *G06F 3/167* (2013.01); *B60K 2370/1575* (2019.05); *G10L 2015/228* (2013.01)

(58) Field of Classification Search
USPC .......................... 704/246, 247, 251, 252, 275
See application file for complete search history.

(56) References Cited

U.S. PATENT DOCUMENTS

| 5,809,447 A | 9/1998 | Kato et al. |
| 2003/0154079 A1 | 8/2003 | Masako et al. |
| 2006/0087453 A1* | 4/2006 | Iwane ...................... G08G 3/02 340/988 |
| 2006/0271284 A1* | 11/2006 | Watanabe ............ G01C 21/367 701/431 |

(Continued)

FOREIGN PATENT DOCUMENTS

| JP | 2011/118692 | 6/2011 |
| JP | 2014-038188 | 2/2014 |
| JP | 2015-200696 | 11/2015 |

OTHER PUBLICATIONS

Extended European Search Report for 19213819.6 dated Mar. 10, 2020, 9 pgs.
Office Action for EP19 213 819.6 dated Jan. 26, 2021, 8 pgs.

*Primary Examiner* — Leonard Saint-Cyr
(74) *Attorney, Agent, or Firm* — Crowell & Moring, L.L.P.

(57) ABSTRACT

A guide voice output control system includes a voice output control unit having a function of outputting a guide voice in response to a trigger and a function of executing interaction related processing having a reception stage for receiving voice, a recognition stage for recognizing voice, and an output stage for outputting voice based on a recognition result, in which the voice output control unit controls the output of the guide voice according to the processing stage of the interaction related processing when the trigger is generated during the execution of the processing, and dynamically controls the output of the guide voice according to whether or not the processing stage is a stage that does not affect the accuracy of voice recognition or listening difficulty of a user even if the guide voice is output.

13 Claims, 7 Drawing Sheets

(56) References Cited

U.S. PATENT DOCUMENTS

| | | |
|---|---|---|
| 2008/0235017 A1* | 9/2008 | Satomura ................ G10L 15/22 |
| | | 704/246 |
| 2011/0136548 A1 | 6/2011 | Sakai |
| 2011/0288871 A1* | 11/2011 | Suzuki .................... G10L 15/22 |
| | | 704/275 |
| 2014/0136109 A1* | 5/2014 | Sumiyoshi ......... G01C 21/3608 |
| | | 701/539 |
| 2016/0180846 A1* | 6/2016 | Lee .................... B60R 16/0373 |
| | | 704/251 |
| 2017/0102245 A1 | 4/2017 | Iwata et al. |
| 2017/0166147 A1* | 6/2017 | Hiroki ................ B60R 16/0373 |
| 2017/0277512 A1* | 9/2017 | Shiota .................... G06F 3/013 |
| 2018/0173494 A1* | 6/2018 | Choi ...................... G06N 20/00 |

\* cited by examiner

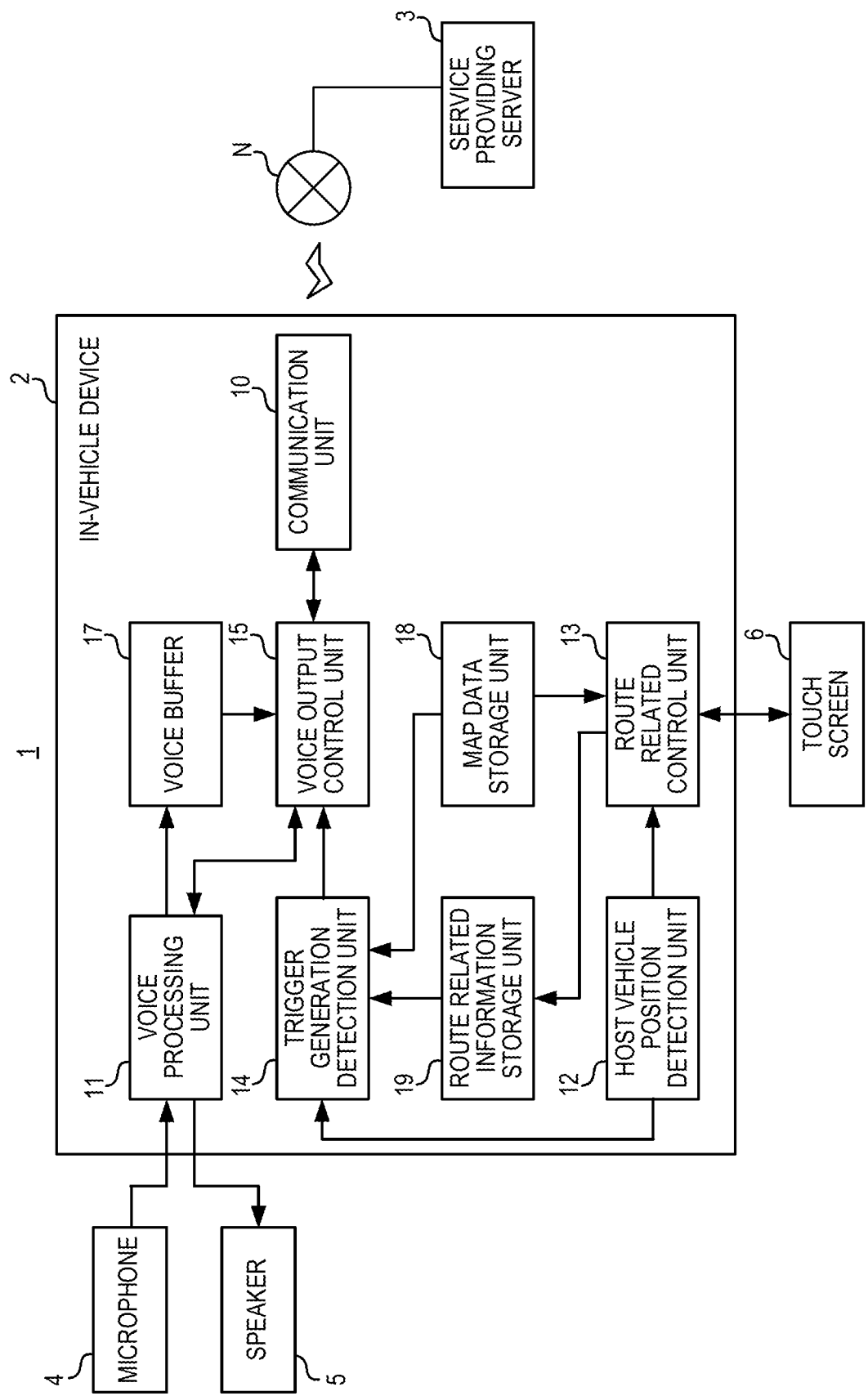

FIG. 2

| TYPE | GUIDE START DISTANCE | VOICE CONTENTS ||||||| URGENCY |
| --- | --- | --- | --- | --- | --- | --- | --- | --- | --- |
| | | DISTANCE PHRASE | COUNTDOWN MARK PHRASE | COUNTDOWN REMAINING PHRASE | INTERSECTION NAME PHRASE | MANEUVER PHRASE | DIRECTION NAME PHRASE | RIGHT/LEFT-TURN EXCLUSIVE LANE PHRASE | |
| LONG DISTANCE GUIDE VOICE | 700 METERS | ABOUT 700 METERS AWAY | - | - | ⟨AT⟩ ○○ INTERSECTION | RIGHT DIRECTION | ⟨IS⟩ ○○ DIRECTION | ⟨THERE IS⟩ RIGHT-TURN EXCLUSIVE LANE | LOW LEVEL |
| MIDDLE DISTANCE GUIDE VOICE | 300 METERS | ABOUT 300 METERS AWAY | ⟨PASSING THROUGH⟩ RIGHT ○○ | FOURTH SIGNAL ⟨⟩ | ⟨AT⟩ ○○ INTERSECTION | ⟨IS⟩ RIGHT DIRECTION | - | ⟨THERE IS⟩ RIGHT-TURN EXCLUSIVE LANE | MIDDLE LEVEL |
| NEAR DISTANCE GUIDE VOICE | 100 METERS | BEFORE LONG | - | SECOND SIGNAL ⟨⟩ | - | ⟨IS⟩ RIGHT DIRECTION | - | - | MIDDLE LEVEL |
| IMMEDIATELY PRECEDING GUIDE VOICE | 30 METERS | - | - | THIS SIGNAL | - | ⟨IS⟩ RIGHT SIDE | - | - | HIGH LEVEL |

FIG. 3

| SERIAL NUMBER | PROCESSING STAGE | URGENCY | PROCESSING CONTENTS |
|---|---|---|---|
| A1 | RECEPTION STAGE | LOW LEVEL | CONTINUOUSLY EXECUTE INTERACTION RELATED PROCESSING, AND OUTPUT GUIDANCE VOICE AFTER PROCESSING IS COMPLETED |
| A2 | RECEPTION STAGE | MIDDLE LEVEL | HOLD OUTPUT OF GUIDE VOICE DURING RECEPTION STAGE. OUTPUT SHORTENED GUIDE VOICE AFTER SHIFTING TO RECOGNITION STAGE |
| A3 | RECEPTION STAGE | HIGH LEVEL | OUTPUT VOICE GUIDANCE BY INTERRUPTING RECEPTION STAGE, AND AFTER COMPLETION OF VOICE GUIDANCE, RESUME RECEPTION STAGE |
| A4 | RECOGNITION STAGE | LOW LEVEL | CONTINUOUSLY EXECUTE INTERACTION RELATED PROCESSING, AND OUTPUT GUIDE VOICE AFTER PROCESSING IS COMPLETED |
| A5 | RECOGNITION STAGE | MIDDLE LEVEL | OUTPUT SHORTENED GUIDE VOICE DURING RECOGNITION STAGE. WHEN RESPONSE VOICE DATA IS RECEIVED BEFORE OUTPUT OF GUIDE VOICE IS COMPLETED, PROCESSING SHIFTS TO OUTPUT STAGE AFTER OUTPUT OF GUIDE VOICE IS COMPLETED |
| A6 | RECOGNITION STAGE | HIGH LEVEL | OUTPUT GUIDE VOICE DURING RECOGNITION STAGE. WHEN RESPONSE VOICE DATA IS RECEIVED BEFORE OUTPUT OF GUIDE VOICE IS COMPLETED, PROCESSING SHIFTS TO OUTPUT STAGE AFTER OUTPUT OF GUIDE VOICE IS COMPLETED |
| A7 | OUTPUT STAGE | LOW LEVEL | CONTINUOUSLY EXECUTE INTERACTION RELATED PROCESSING, AND OUTPUT GUIDE VOICE AFTER PROCESSING IS COMPLETED |
| A8 | OUTPUT STAGE | MIDDLE LEVEL | HOLD OUTPUT OF GUIDE VOICE DURING OUTPUT STAGE. OUTPUT GUIDE VOICE AFTER OUTPUT STAGE IS ENDED |
| A9 | OUTPUT STAGE | HIGH LEVEL | OUTPUT GUIDE VOICE BY INTERRUPTING OUTPUT STAGE. RESUME OUTPUT STAGE AFTER OUTPUT OF GUIDE VOICE IS COMPLETED |

FIG. 4

| SERIAL NUMBER | TYPE | VOICE CONTENTS | | | | | |
|---|---|---|---|---|---|---|---|
| | | DISTANCE PHRASE | COUNTDOWN MARK PHRASE | COUNTDOWN REMAINING PHRASE | INTERSECTION NAME PHRASE | MANEUVER PHRASE | DIRECTION NAME PHRASE | RIGHT/LEFT-TURN EXCLUSIVE LANE PHRASE |
| B1 | MIDDLE DISTANCE GUIDE VOICE | ~~ABOUT 300 METERS AWAY~~ | ~~⟨PASSING THROUGH⟩ RIGHT ○○~~ | FOURTH SIGNAL ⟨⟩ | ~~⟨AT⟩ ○○ INTERSECTION~~ | ⟨IS⟩ RIGHT DIRECTION | - | ~~⟨THERE IS⟩ LANE FOR TURNING RIGHT~~ |
| B2 | SHORT DISTANCE GUIDE VOICE | ~~BEFORE LONG~~ | - | SECOND SIGNAL ⟨⟩ | - | ⟨IS⟩ RIGHT DIRECTION | - | - |

GUIDE VOICE OUTPUT CONTROL SYSTEM AND GUIDE VOICE OUTPUT CONTROL METHOD

RELATED APPLICATION

The present application claims priority to Japanese Patent Application Number 2018-228948, filed Dec. 6, 2018, the entirety of which is hereby incorporated by reference.

BACKGROUND

1. Field of the Invention

The present invention relates to a guide voice output control system and a guide voice output control method, and more particularly, to a guide voice output control system and a guide voice output control method suitable for outputting a vehicle related voice to a user onboard the vehicle.

2. Description of the Related Art

Conventionally, a system having a function of outputting vehicle related guide voices (intersection guide related voice, traffic jam related voice, overspeed related voice, and the like) to a user onboard a vehicle has become widespread, and various technologies related to voice output have been proposed. For example, JP 2014-038188 A describes a technology of switching a plurality of applications that are targets of outputting voice according to priority of the applications in a system capable of outputting voice based on the applications. According to the technology of JP 2014-038188 A, even if there is a newly added application, it is possible to realize dynamic voice switching according to the nature of the application.

Further, JP 2011-118692 A describes a technology of broadcasting voice information data by shortening a message length of the voice information data when the number of voice information data is large but broadcasting the voice information data without shortening the message length of the voice information data when the number of voice information data is small, according to the number of voice information data which need to be broadcasted at the same time in a system of broadcasting (outputting) voice based on the voice information data. According to the technology of JP 2011-118692 A, when it is necessary to provide a large amount of information to a user onboard a vehicle in a short time, it is possible to provide the large amount of information in a short time.

In addition, JP 2015-200696 A discloses a technology of notifying that there is an incoming call by fixedly outputting a message without executing voice synthesis for route guidance if the voice synthesis for the route guidance is being executed, but notifying that there is the incoming call by generating and outputting a message including detailed information about the incoming call by the voice synthesis if the voice synthesis for the route guidance is not being executed, when it is detected that there is the incoming call to a voice call terminal in a system that synthesizes and outputs voice related to route guidance. According to the technology of JP 2015-200696 A, when there is the incoming call to the voice call terminal, it is possible to provide notification of the incoming call by the voice in an appropriate manner depending on whether or not the voice synthesis for the route guidance is being executed.

However, in recent years, a device having a voice interaction function called a smart speaker has become widespread. In response to this, there is a movement to install the voice interaction function of the smart speaker in the system separately from the function of outputting a vehicle related guide voice (hereinafter, referred to as "guide voice output function"). As a specification when the voice interaction function is installed in the system, it is considered that the guide voice output function is turned off during the period when processing (hereinafter referred to as "interaction related processing") related to interaction based on the voice interaction function is performed so that the voice based on the guide voice output function is not output during the period. By doing so, the voice uttered by the user onboard the vehicle and the voice output by the system by the guide voice output function are not mixed, and as a result, it is possible to expect the improvement in voice recognition accuracy. In addition, the voice output from the system by the voice interaction function and the voice output from the system by the guide voice output function are not mixed, and as a result, it is possible to expect the improvement in listening ease by a user.

However, with such a specification, the vehicle related voice is not output at all while the interaction related processing is being performed, which may cause a disadvantage to the user. In order to prevent the occurrence of such disadvantages to the user, if the guide voice output function is turned on even during the period when the interaction related processing based on the voice interaction function is performed, the accuracy of the voice recognition is lowered and the listening ease by the user is lowered.

The present invention has been made to solve such problems, and an object of the present disclosure is to suppress the disadvantage to the user due to the fact that a vehicle related guide voice is not output at all during the execution of the interaction related processing, and then suppress a reduction in accuracy of voice recognition and a reduction in listening ease by a user, in a system having a voice interaction function and a function of outputting a vehicle related voice.

SUMMARY

In order to solve the above problems, the present disclosure provides a function of outputting a vehicle related guide voice in response to a generation of a trigger and a function of realizing voice interaction by executing interaction related processing having a reception stage for receiving voice as a recognition target, a recognition stage for recognizing voice, and an output stage for outputting voice based on a recognition result to a voice output unit to control output of guide voice according to a processing stage of the interaction related processing at the time of the generation of the trigger when the trigger is generated during the execution of the interaction related processing.

According to the present disclosure, since the output of the vehicle related guide voice is dynamically controlled according to the processing stage of the interaction related processing, if the trigger outputting the vehicle related guide voice is generated during the execution of the interaction related processing, it is possible to cope with outputting the guide voice when the processing stage of the interaction related processing is a stage that does not affect the accuracy of voice recognition or the listening difficulty of the user even if the guide voice is output. For this reason, even when the interaction related processing is being executed, the case where guide voice is output can appear and the disadvantage to the user can be suppressed compared to the configuration in which the guide voice is not output at all while the interaction related processing is being executed. In addition, according to the present disclosure, when the processing stage of the interaction related processing is a stage that has the influence as described above, it is possible to cope with not outputting the guide voice. For this reason, when the trigger outputting the guide voice is generated during the execution of the interaction voice related processing, it is possible to suppress the reduction in the accuracy of voice recognition and the reduction in the listening ease by the user compared to the configuration that always outputs the guide voice.

BRIEF DESCRIPTION OF THE DRAWINGS

FIG. 1 is a block diagram illustrating a functional configuration example of a guide voice output control system according to an embodiment of the present invention;

FIG. 2 is a diagram used for describing guide voice related to intersection related guidance;

FIG. 3 is a table in which processing contents are clearly shown for each combination of a processing stage and an urgency;

FIG. 4 is a diagram used for describing a short sentence;

DETAILED DESCRIPTION OF THE PREFERRED EMBODIMENTS

Figure 5:
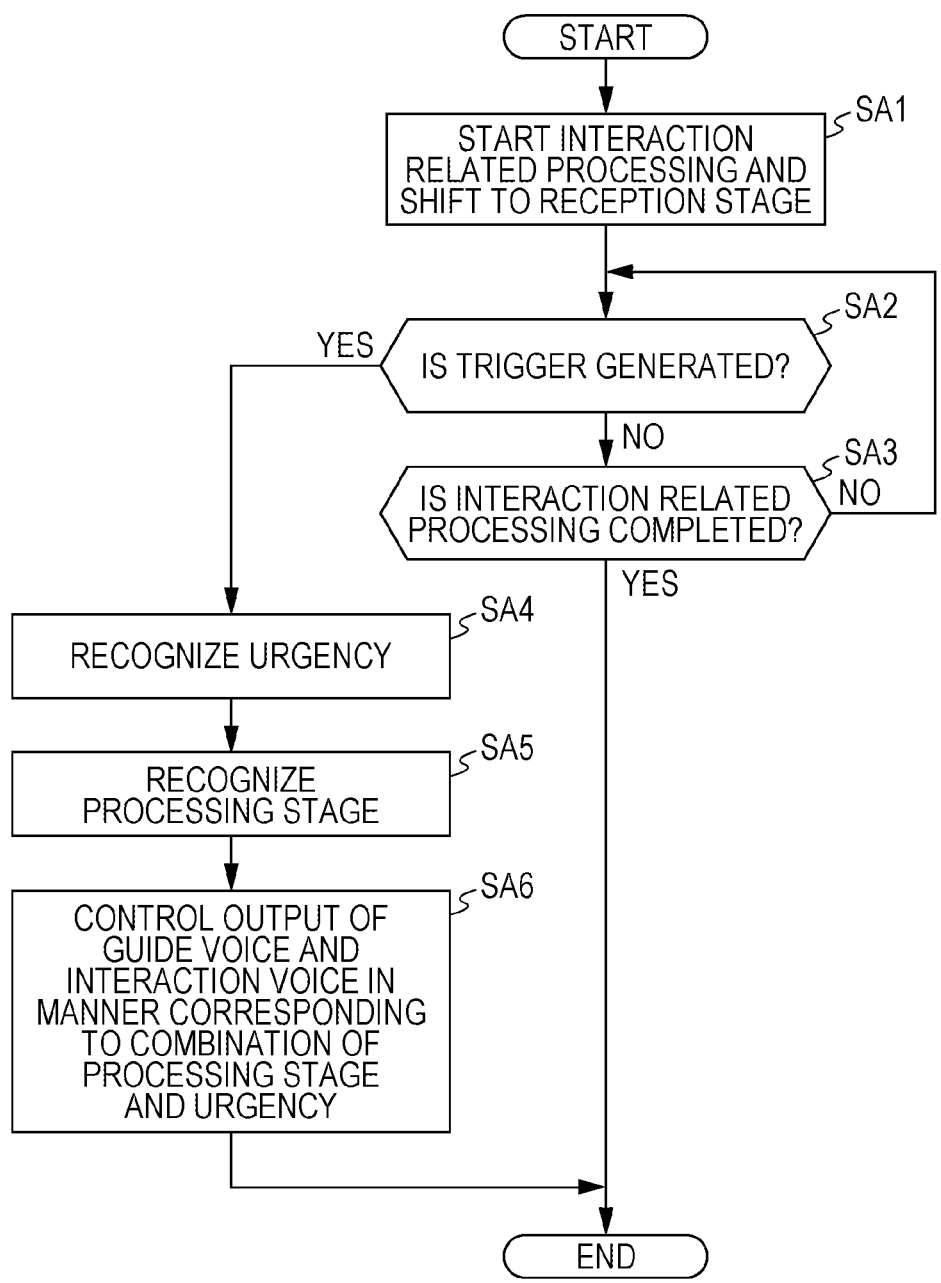
FIG. 5 is a flowchart illustrating an operation example of an in-vehicle device according to an embodiment of the present invention.

Hereinafter, an embodiment of the present invention will be described with reference to the drawings. FIG. 1 is a block diagram illustrating a functional configuration example of a guide voice output control system 1 according to an embodiment of the present invention. As illustrated in FIG. 1, the guide voice output control system 1 includes an in-vehicle device 2. The in-vehicle device 2 can access a network N configured to include a communication network such as the Internet or a telephone network. A service providing server 3 is connected to the network N.

The service providing server 3 is a cloud server that provides a service related to voice recognition. The service providing server 3 provides a service for realizing voice interaction between a client terminal (in-vehicle device 2 in the present embodiment) and a user. The service providing server 3 according to the present embodiment recognizes the voice of the user collected on the client terminal side and outputs to the client terminal the voice having the contents corresponding to the contents of the user's voice based on the recognition result. The processing of the service providing server 3 related to the voice recognition will be described below.

The in-vehicle device 2 is a so-called car navigation system mounted in a vehicle, and has a function of detecting a current position of the vehicle and a function of searching for and guiding a route (hereinafter, referred to as a "guidance route") to a destination set by a user who boards the vehicle, and the like. Note that the in-vehicle device 2 may not be a device fixedly attached to the vehicle. For example, the in-vehicle device 2 may be a mobile terminal brought into the vehicle by the user. As illustrated in FIG. 1, a microphone 4, a speaker 5, and a touch screen 6 are connected to the in-vehicle device 2. Hereinafter, a vehicle equipped with the in-vehicle device 2 is referred to as a "host vehicle".

The microphone 4 is a sound collecting device provided at a position where voice uttered by a user who boards the host vehicle can be collected. The speaker 5 is a sound emitting device that outputs voice into the host vehicle. The touch screen 6 is provided with a display provided at a position which is visible to the user onboard the host vehicle, such as a dashboard of the host vehicle or a center console, and a touch panel which is superimposed on the display and detects a touch operation for a display area of the display.

As illustrated in FIG. 1, the in-vehicle device 2 includes a communication unit 10, a voice processing unit 11, a host vehicle position detection unit 12, a route related control unit 13, a trigger generation detection unit 14, and a voice output control unit 15 as functional components. Each of the functional blocks 10 to 15 can be configured by any of hardware, a digital signal processor (DSP), and software. For example, when the functional blocks are configured by software, actually, each of the functional blocks 10 to 15 is configured to include a CPU, a RAM, a ROM, and the like of a computer, and is realized by an operation of a program stored in a recording medium such as the RAM, the ROM, a hard disk, or a semiconductor memory.

As illustrated in FIG. 1, the in-vehicle device 2 includes a voice buffer 17, a map data storage unit 18, and a route related information storage unit 19 as storage units. The voice buffer 17 is a temporary storage area in which input voice data to be described later is buffered. The map data storage unit 18 stores map data. The map data includes road data used for searching for a guidance route in addition to drawing data used for drawing a map. The road data includes information on nodes defined for each node in a road network and information on links defined for each road section between the nodes. The route related information storage unit 19 stores route related information described later.

The communication unit 10 accesses a network N according to a predetermined communication standard, and communicates with external devices (including the service providing server 3) connected to the network N. Any communication method may be used when the communication unit 10 accesses the network N, and any communication standard may be used for communication with the external devices. For example, the communication unit 10 communicates with a mobile terminal brought into the host vehicle by wireless communication such as Bluetooth (registered trademark) or Wi-Fi (registered trademark), and accesses the network N using a tethering function of the mobile terminal. In addition, the communication unit 10 accesses the network N by directly accessing the mobile communication network.

The voice processing unit 11 generates voice data by performing analog/digital conversion processing including sampling, quantization, and encoding processing on the voice collected by the microphone 4, and buffers the voice data in the voice buffer 17. As a result, the voice data based on the voice collected by the microphone 4 during a predetermined period from the present time are stored in the voice buffer 17. Hereinafter, a set of voice data stored in the voice buffer 17 is referred to as "input voice data". The buffering of the input voice data by the voice processing unit 11 is continuously performed regardless of whether or not the interaction related processing described later is being executed.

In addition, the voice processing unit 11 includes a D/A converter, a volume circuit, an amplifier circuit, and the like, and converts the voice data input from the voice output control unit 15 into digital/analog by the D/A converter, adjusts a volume level by a volume circuit, amplifies the converted voice data by an amplifier circuit, and outputs the amplified voice data as voice from the speaker 5.

The host vehicle position detection unit 12 detects the current position (hereinafter referred to as "host vehicle position") of the host vehicle based on detection results of sensors (not shown) such as a GPS unit, an acceleration sensor, a gyro sensor, and a vehicle speed sensor.

When the destination is specified by the user and the guidance of the guidance route is instructed, the route related control unit 13 searches for the guidance route based on the map data stored in the map data storage unit 18, and guides the searched guidance route. The guidance of the guidance route is performed by an existing method such as specifying an image showing the current position of the host vehicle and the guidance route on the map.

When searching for the guidance route, the route related control unit 13 stores the route related information including information indicating the guidance route and the guide intersection in the route related information storage unit 19. The information indicating the guidance route is information that can specify the guidance route on the map, and includes, for example, a combination of a link ID of each link and a node ID of each node constituting the guidance route. In addition, the guide intersection is an intersection where a right/left turn is performed among the intersections included in the guidance route. The information indicating the guide intersection is information that can specify the guide intersection on the map, and includes, for example, the node ID of the node corresponding to the guide intersection.

The trigger generation detection unit 14 detects when the trigger performing guidance related to the guide intersection is generated. As described in detail, in the present embodiment, if the vehicle approaches the guide intersection during the guidance of the guidance route, the trigger is configured to output guide voices having different contents at each timing when a separation distance becomes 700 meters, 300 meters, 100 meters, and 30 meters according to the separation distance between the guide intersection and the host vehicle. The contents of the guide voice will be described later. Hereinafter, the separation distances (700 meters, 300 meters, 100 meters, and 30 meters) between the guide intersection and the host vehicle that become the trigger outputting the guide voice is collectively referred to as a "guide start distance". During the guidance of the guidance route, the trigger generation detection unit 14 detects the separation distance between the guide intersection and the host vehicle, monitors whether or not the separation distance has become the guide start distance, and detects when the separation distance becomes the guide start distance based on the detection result of the host vehicle position detection unit 12, the map data stored in the map data storage unit 18, and the route related information stored in the route related information storage unit 19.

The voice output control unit 15 has a guide voice output function and a voice interaction function. Furthermore, when the trigger performing the intersection related guidance is generated during the execution of the interaction related processing based on the voice interaction function, the voice output control unit 15 executes voice output control processing to control the output of the guide voice by the guide voice output function and the output of the interaction voice by the voice interaction function. Hereinafter, after describing the guide voice output function and the voice interaction function in order, the voice output control processing will be described.

<Guide Voice Output Function>

First, the guide voice output function will be described. The following description of the guide voice output function is for describing the basic processing executed by the voice output control unit 15, and it is assumed that the guide voice output function is not executed during the execution of the voice interaction function.

FIG. 2 is a diagram used to describe the guide voice related to the intersection related guidance. As illustrated in FIG. 2, in the present embodiment, as the type of guide voices, there are long distance guide voice having a guide start distance of 700 meters, middle distance guide voice of 300 meters, short distance guide voice of 100 meters, and immediately preceding guide voice of 30 meters (see "type" field and "guide start distance" field). Contents (sentences corresponding to guide voices) of each type of guide voice consists of seven phrases such as a distance phrase, a countdown mark phrase, a countdown remaining phrase, an intersection name phrase, a maneuver phrase, a direction name phrase, and a right/left-turn exclusive lane phrase (see "voice contents" field). However, there is a phrase that is not assigned words, depending on the type of guidevoice.

In the example of FIG. 2, the contents of the long distance guide voice is "about 700 meters away, <at> oo intersection, right direction, <is> oo direction. <There is> right-turn exclusive lane." In addition, in the example of FIG. 2, the contents of the middle distance guide voice are "about 300 meters away, <passing through> right oo, fourth signal < >, <at> oo intersection, <is> right direction. <There is> right-turn exclusive lane". Note that the wording enclosed by "<" ">" represents a word added according to a predetermined rule in order to make a sentence corresponding to the guide voice a natural sentence.

When the trigger generation detection unit 14 detects that the separation distance between the guide intersection and the host vehicle becomes the guide start distance i.e., when it is detected that the trigger is generated), the voice output control unit 15 recognizes the type of guide voice corresponding to the guide start distance. Next, the voice output control unit 15 generates the sentence corresponding to the guide voice corresponding to the recognized type. An example of the sentence generated here is as illustrated in FIG. 2.

For the distance phrase, the voice output control unit 15 detects the separation distance between the host vehicle position and the guide intersection at that time again based on the detection result of the host vehicle position detection unit 12, the map data stored in the map data storage unit 18, and the route related information stored in the route related information storage unit 19, and makes the distance phrase into a word reflecting the detected separation distance. In other words, if the separation distance is 600 meters at that time, the distance phrase is "approximately 600 meters away". Similarly, for the countdown remaining phrase, the voice output control unit 15 again detects the number of intersections through which the host vehicle should pass up to reaching the guide intersection at that time based on various types of information, and makes the countdown remaining phrase into a word reflecting the number of detected intersections.

As a result, even when a time lag occurs between the timing when the trigger generation detection unit 14 detects the generation of the trigger and the timing when the voice output control unit 15 generates the sentence corresponding to the guide voice, the words of the distance phrase and the countdown remaining phrase are words having appropriate contents corresponding to the timing when the sentence is generated. In addition, the voice output control unit 15 assigns an appropriate word to the countdown mark phrase, the intersection name phrase, the maneuver phrase, the direction name phrase, and the right/left-turn exclusive lane phrase based on the detection result of the host vehicle position detection unit 12, the map data stored in the map data storage unit 18, and the route related information stored in the route related information storage unit 19. The map data includes information necessary for assigning words to these phrases.

After generating the sentence corresponding to the guide voice, the voice output control unit 15 generates voice data for outputting the generated sentence as the guide voice. Hereinafter, the voice data in which the guide voice is recorded is referred to as "guide voice data". The generation of the guide voice data is appropriately performed by existing technologies such as voice synthesis processing. Next, the voice output control unit 15 outputs the generated guide voice data to the voice processing unit 11 via a buffer (not shown), and causes the voice processing unit 11 to output the guide voice recorded in the guide voice data from the speaker 5.

As described above, in the guide voice output function, when the trigger generation detection unit 14 detects that the separation distance between the guide intersection and the host vehicle is the guide start distance (when it is detected that the trigger outputting the guide voice is generated), the voice output control unit 15 generates the guide voice data in which the guide voice of the type corresponding to the guide start distance is recorded, outputs the guide voice data to the voice processing unit 11, and causes the guide voice to be output. By the guide voice output function, a user onboard a host vehicle can listen to a guide voice having appropriate contents according to the distance to the guide intersection.

<Voice Interaction Function>

Next, the voice interaction function will be described. The following description of the voice interaction function is for describing the basic processing executed by the voice output control unit 15, and the guide voice output function described above is not executed during the execution of the voice interaction function.

When the voice interaction function starts, a user utters a predetermined specific word called a wake word. When the specific word is uttered by the user, the input voice data in which the voice corresponding to the wake word is recorded are stored in the voice buffer 17 by the function of the voice processing unit 11. The voice output control unit 15 continuously analyzes the input voice data stored in the voice buffer 17 and detects when the voice corresponding to the wake word is recorded in the input voice data. Hereinafter, detecting that the voice corresponding to the wake word is recorded in the input voice data is simply expressed as "detecting the wake word". The detection of the wake word is appropriately performed according to the existing description. As an example, the voice output control unit 15 frequently compares the voice pattern (voice waveform) recorded in the input voice data with the pre-registered "voice pattern corresponding to the wake word" to calculate similarity, and detects that the voice corresponding to the wake word is recorded in the input voice data when the calculated similarity is greater than a threshold.

When the wake word is detected, the voice output control unit 15 starts executing the interaction related processing.

The interaction related processing is processing having a reception stage, a recognition stage, and an output stage as processing stages. According to the detection of the wake word, the voice output control unit 15 first shifts to the reception stage and executes the corresponding process. The reception stage is a stage of receiving voice input to the voice processing unit 11 via the microphone 4 as a recognition target. After uttering the wake word, the user utters a word (hereinafter, referred to as "request") that he/she wants to be answered by a service provided by the service providing server 3 such as any question or any request. Since the user utters the wake word and then continuously utters the request, the request is basically uttered at the reception stage.

The voice output control unit 15 analyzes the input voice data stored in the voice buffer 17, and for the voice (the voice assumed to be a request) following the voice corresponding to the wake word, when the period when no voice is input continues for a certain time or more, the reception stage is ended and the processing shifts to the recognition stage. In this case, it is assumed that the user has stopped uttering the request.

When the processing shifts to the recognition stage, the voice output control unit 15 generates the processing request data. The processing request data includes voice data to be recognized and control information data. The voice data to be recognized are voice data in which the voice corresponding to the wake word and the voice corresponding to the request are recorded among the input voice data stored in the voice buffer 17. The voice output control unit 15 generates the voice data to be recognized by extracting the voice data including the portion in which the voice corresponding to the wake word and the voice corresponding to the request are recorded from the input voice data. At that time, the voice output control unit 15 generates the voice data to be recognized in a manner that satisfies the functional requirements required for using the service provided by the service providing server 3. For example, for the voice data to be recognized, when it is required to include voice data for a predetermined time before the wake word part, the voice output control unit 15 generates the voice data to be recognized in a manner that satisfies the request. Note that the voice data to be recognized may be subjected to format conversion processing, data shaping processing, or the like, if necessary.

The control information data is data (for example, JSON format data) in which necessary reference information regarding the voice data to be recognized is described according to a predetermined format. For example, the control information data includes information used for identifying processing request data, information indicating the format of the voice data to be recognized, and information indicating a start point and an end point of the wake word in the voice data to be recognized according to the specification.

After generating the processing request data, the voice output control unit 15 transmits the generated processing request data to the service providing server 3. The information (address of the service providing server 3, information necessary for authentication, or the like) necessary for transmitting the processing request data to the service providing server 3 is registered in advance.

When receiving the processing request data, the service providing server 3 performs analysis including voice recognition for the voice data to be recognized based on contents of the control information data, and generates a response to the request by the user. The generation of the response is appropriately performed based on the existing technology. For example, the response is "Tomorrow's oo weather is sunny" for a request "Tell tomorrow's oo weather" (oo indicates a place). In this case, the service providing server 3 recognizes the contents of the request through voice recognition processing by artificial intelligence, natural language processing, information summarization processing, or the like, collects the information necessary to respond to the request (in this example, information indicating tomorrow's oo weather), and generates the response based on the collected information.

After generating the response, the service providing server 3 generates voice data (hereinafter, referred to as "response voice data") in which the voice corresponding to the response is recorded. Next, the service providing server 3 transmits the response voice data to the in-vehicle device 2.

The voice output control unit 15 of the in-vehicle device 2 receives the response voice data transmitted by the service providing server 3. The voice output control unit 15 shifts the processing stage to the output stage in response to the reception of the response voice data. In the output stage, the voice output control unit 15 outputs the received response voice data to the voice processing unit 11 via the buffer (not shown), and outputs the sound corresponding to the response recorded in the response voice data from the speaker 5. When the voice output based on the response voice data is ended, the voice processing unit 11 notifies the voice output control unit 15 of that effect. When receiving the notification, the voice output control unit 15 ends the output stage, and thus ends the interaction related processing.

As described above, in a series of processes that is started in response to the recognition of the wake word and is ended by outputting the voice based on the response voice data, the processing having the reception stage, the recognition stage, and the output stage as the processing stages is the interaction related processing. In this interaction related processing, since various processes including the voice recognition are performed by the service providing server 3, the recognition stage may take several seconds or more.

As described above, in the voice interaction function, when the user utters the request together with the wake word, the voice output control unit 15 uses the function of the service providing server 3 to output the response corresponding to the request by voice. By the voice interaction function, the user onboard the host vehicle can perform the voice interaction with the in-vehicle device 2.

<Sound Output Control Processing>

Next, the voice output control processing will be described. In the voice output control processing, the voice output control unit 15 monitors whether or not it is detected that the trigger outputting the guide voice related to the intersection related guidance is generated by the trigger generation detection unit 14 while executing the interaction related processing based on the voice interaction function. When the trigger is generated during the execution of interaction related processing, the voice output control unit 15 recognizes the type of guide voice corresponding to the guide start distance, and further recognizes the urgency of the type of guide voice.

As described above, in the present embodiment, there are the long distance guide voice, the middle distance guide voice, the short distance guide voice, and the immediately preceding guide voice as the type of guide voice related to the intersection related guidance. In addition, in the present embodiment, for the urgency, three levels such as "high level" at which the urgency is highest, "low level" at which the urgency is lowest, and "medium level" between the high level and the low level of urgency are defined. Then, the "low level" is assigned as the urgency of the long distance guide voice, the "medium level" is assigned as the urgency of the middle distance guide voice and the short distance guide voice, and the "high level" is assigned as the urgency of the immediately preceding guide voice (see the "urgency" field in FIG. 2). The reason why as the guide voice has a shorter guide start distance, the urgency is higher is as follows. In other words, the short guide start distance means that the separation distance between the guide intersection and the host vehicle at the timing when the guide voice is output is short, and it is necessary for the user to recognize the guidance related to the guide intersection as quickly as possible.

Next, the voice output control unit 15 recognizes the processing stage (reception stage, recognition stage, or output stage) at the present time (the timing when the trigger is generated). Then, the voice output control unit 15 controls the output of the guide voice according to the processing stage at the timing when the trigger is generated and the urgency of the guide voice to be output. Hereinafter, the processing of the voice output control unit 15 for each combination of the processing stage and the urgency will be described with reference to FIG. 3. FIG. 3 is a table specifying the processing contents of the processing executed by the voice output control unit 15 for each combination of the processing stage and the urgency.

<Case where Processing Stage is Reception Stage and Urgency is Low Level (See Record with Serial Number A1 in FIG. 3)>

When the processing stage at the timing when the trigger is generated is the "reception stage" and the urgency of the guide voice is the "low level", the voice output control unit 15 executes the following processing. That is, the voice output control unit 15 holds the output of the guide voice by the guide voice output function, and executes the interaction related processing by the voice interaction function as usual. When the output of the guide voice is held, the voice output control unit 15 does not perform the generation of the sentence corresponding to the guide voice. The voice output control unit 15 executes the processing related to the output of the guide voice after the interaction related processing is completed. The processing related to the output of the guide voice includes the generation of the sentence corresponding to the guide voice, the generation of the guide voice data, and the output of the guide voice data to the voice processing unit 11, and the contents of the distance phrase and the countdown remaining phrase are appropriate contents corresponding to the timing when the guide voice is output. Note that the fact that the contents of the distance phrase and the countdown remaining phrase are appropriate contents corresponding to the timing when the guide voice is output is similarly applied to the following cases, and therefore will not be particularly described below.

Since the above processing is performed in this case, the following effects are obtained. That is, when the urgency is the low level, the host vehicle position and the guide intersection are sufficiently separated (in the present embodiment, 700 meters apart), and there is little need to immediately provide the guide related to the guide intersection to the user. Based on this, by executing the above processing in this case, first, the guide voice is not output at the reception stage, so the voice according to the request by the user and guide voice are not mixed, and the reduction in the accuracy of the voice recognition by the service providing server 3 can be suppressed, and the guide voice is not output in the output stage, so the voice related to the response by the in-vehicle device 2 and the guide voice are not mixed and the reduction in the listening ease of the user for the voice related to the response can be suppressed. In addition, a smooth voice interaction is realized without the voice interaction between the user and the in-vehicle device 2 being disturbed by the guide voice having the low urgency, so the reduction in user satisfaction can be suppressed.

<Case where Processing Stage is Reception Stage and Urgency is Medium Level (See Record with Serial Number A2 in FIG. 3)>

When the processing stage at the timing when the trigger is generated is the "reception stage" and the urgency of the guide voice is the "medium level", the voice output control unit 15 executes the following processing. That is, the voice output control unit 15 continues the reception stage, and holds the output of the guide voice during the reception stage. That is, in this case, the reception stage is continuously maintained, and the user can speak the request. On the other hand, the voice output control unit 15 outputs the guide voice during the recognition stage after the processing shifts from the reception stage to the recognition stage. Hereinafter, the processing of the voice output control unit 15 at the time of outputting the guide voice during the recognition stage will be described in detail.

The voice output control unit 15 generates the sentence corresponding to the guide voice according to the shift to the recognition stage. At that time, the voice output control unit 15 generates a sentence (hereinafter, referred to as "short sentence") obtained by shortening a sentence at normal time according to the predetermined rule.

FIG. 4 is a diagram used for describing the short sentence. In FIG. 4, a record of serial number B1 indicates a short sentence obtained by shortening the sentence (sentence at normal time) corresponding to the medium distance guide voice illustrated in FIG. 2, and a record of serial number B2 indicates a short sentence obtained by shortening the sentence corresponding to the short distance guide voice illustrated in FIG. 2. As illustrated in the records of the serial number B1 and the serial number B2 in FIG. 4, in the present embodiment, the voice output control unit 15 generates, as the short sentence corresponding to the guide voice having the medium level of urgency, a sentence in which phrases other than the countdown remaining phrase and the maneuver phrase are deleted from normal sentences.

As a result, for example, the short sentence corresponding to the middle distance guide voice illustrated in FIG. 2 is a short sentence "fourth signal < ><is> right direction". The phrase to be deleted is selected in consideration of whether or not it is useful information for the user when the user recognizes the guide intersection.

After generating the short sentence, the voice output control unit 15 generates the guide voice data in which the voice corresponding to the short sentence is recorded. Next, the voice output control unit 15 outputs the generated guide voice data to the voice processing unit 11. When the voice output control unit 15 outputs the guide voice data to the voice processing unit 11 and then receives the response voice data from the service providing server 3, the voice output control unit 15 shifts to the output stage in response to the reception of the response voice data. Note that the period of the recognition stage may be very short. In such a case, as described in <Case where Processing Stage is Recognition Stage and Urgency is Medium Level (See Record with Serial Number A5 in FIG. 3)> described below, after the output of the guide voice is completed, the processing may shift to the output stage.

Since the above processing is performed in this case, the following effects are obtained. That is, when the urgency is the medium level, it is required that guidance related to the guide intersection be performed at the earliest possible stage compared to the low level, but until the host vehicle position reaches the guide intersection, there is a margin in terms of distance and time, and a slight time lag is allowed from when the trigger is generated until the guidance is started. Based on this, by executing the above processing in this case, first, the guide voice is not output at both the reception stage and the output stage, so the reduction in the accuracy of the voice recognition and the reduction in the listening ease of the user can be suppressed. In addition, since the voice corresponding to the request is not received and the voice corresponding to the response is not output in the recognition stage, even if the guide voice is output in the recognition stage, it does not adversely affect the accuracy of the voice recognition or the listening ease of the user. In other words, in this case, the voice output control unit 15 executes processing that suitably uses the fact that even if the voice is output in this recognition stage between the reception stage and the output stage in the interaction related processing, it does not adversely affect the accuracy of voice recognition and listening ease of the user. The same applies to other cases in which the guide voice is output in the recognition stage.

Furthermore, in this case, the guide voice is output in the recognition stage that arrives after the reception stage, so it is possible to quickly perform the guidance related to the guide intersection as compared with the case of outputting the guide voice after the interaction related processing is ended. Thereby, in the stage where the guide intersection approximates the extent of 300 meters or 100 meters, it is possible to suppress the disadvantage companied by the fact that the guidance related to the guide intersection is not performed quickly.

<Case where Processing Stage is Reception Stage and Urgency is High Level (See Record with Serial Number A3 in FIG. 3)>

When the processing stage at the timing when the trigger is generated is the "reception stage" and the urgency of the guide voice is the "high level", the voice output control unit 15 executes the following processing. That is, the voice output control unit 15 interrupts the reception stage, outputs the voice guidance, and resumes the reception stage from the beginning after the output of the voice guidance is completed. The voice output control unit 15 does not receive the input voice as the target for the voice recognition while the reception stage is interrupted. More specifically, the voice output control unit 15 does not assume that the input voice data during the period when the reception stage is interrupted are included in the voice data to be authenticated. Note that the voice output control unit 15 may display information for notifying that the reception stage is interrupted on the touch screen 6 during the period when the reception stage is interrupted.

The following effects are obtained by performing the above processing in this case. That is, when the urgency is the high level, unlike the low level or the medium level, it is necessary to immediately provide the guidance related to the guide intersection. This is to allow the user to smoothly and safely perform a right/left turn at the guide intersection by making a user recognize that the host vehicle will immediately reach the guide intersection. Based on this, since the above processing is performed in this case, it is possible to suppress the occurrence of the disadvantage to the user due to the fact that the guide voice having the high level of urgency is not immediately output. In addition, the reception stage is interrupted while the guide voice is being output, so the mixing of the guide voice and the voice spoken by the user is not the target of the voice recognition and the reduction in the accuracy of voice recognition can be suppressed.

<Case where Processing Stage is Recognition Stage and Urgency is Low Level (See Record with Serial Number A4 in FIG. 3)>

When the processing stage at the timing when the trigger is generated is the "recognition stage" and the urgency of the guide voice is the "low level", the voice output control unit 15 executes the following processing. That is, the voice output control unit 15 holds the output of the guide voice by the guide voice output function, and executes the interaction related processing by the voice interaction function as usual. The voice output control unit 15 executes the output of the guide voice after the interaction related processing is completed. This processing is similar to <Case Where Processing Stage is Reception Stage and Urgency is Low Level (See Record with Serial Number A1 in FIG. 3)> The effect obtained by performing the above processing in this case is similar to the effect described in <Case where Processing Stage is Reception Stage and Urgency is Low Level (See Record with Serial Number A1 in FIG. 3)>.

<Case where Processing Stage is Recognition Stage and Urgency is Medium Level (See Record with Serial Number A5 in FIG. 3)>

When the processing stage at the timing when the trigger is generated is the "recognition stage" and the urgency of the guide voice is the "medium level", the voice output control unit 15 executes the following processing. That is, the voice output control unit 15 starts outputting the guide voice in response to the generation of the trigger, and starts outputting the guide voice shortened during the recognition stage. The method for shortening guide voice is similar to the method described in <Case where Processing Stage is Reception Stage and Urgency is Medium Level (See Record with Serial Number A2 in FIG. 3)>.

When the voice output control unit 15 receives the notification that the output of the voice is completed from the voice processing unit 11 after outputting the guide voice data and before receiving the response voice data from the service providing server 3, the voice output control unit 15 shifts to the output stage in response to the reception of the response voice data. In this case, the output of the guide voice is completed before the response voice data is received. On the other hand, when the voice output control unit 15 receives the response voice data from the service providing server 3 after outputting the guide voice data and before receiving the notification that the output of the voice is completed from the voice processing unit 11, the voice output control unit 15 waits until receiving the notification and shifts to the output stage after receiving the notification. In this case, the output of the guide voice is not completed before the response voice data is received. By performing the above processing, the guide voice corresponding to the short sentence is output without being interrupted.

The following effects are obtained by performing the above processing in this case. That is, by the same reason as the reason described in <Case where Processing Stage is Reception Stage and Urgency is Medium Level (See Record with Serial Number A2 in FIG. 3)>, the reduction in the accuracy of voice recognition or the reduction in the listening ease of the user can be suppressed. In addition, even if the guide voice is output in the recognition stage, it is possible to immediately output the guide voice in response to the generation of the trigger by suitably using the fact that it does not adversely affect the accuracy of voice recognition or the listening ease of the user, so the disadvantage to the user is suppressed as compared with the case where there is the time lag from the generation of the trigger to the start of the output of the guide voice. Further, the voice output control unit 15 outputs the shortened guide voice during the recognition stage. For this reason, it is possible to increase the possibility that the output of the guide voice is completed during the recognition stage, that is, before receiving the response voice data from the service providing server 3, and suppress the delay of the shift to the output stage. Further, even when the output of the guide voice is not completed before receiving the response voice data, the guide voice is shortened, so the deviation of timing shifted to the output stage can be shortened.

<Case where Processing Stage is Recognition Stage and Urgency is High Level (See Record with Serial Number A6 in FIG. 3)>

When the processing stage at the timing when the trigger is generated is the "recognition stage" and the urgency of the guide voice is the "high level", the voice output control unit 15 executes the following processing. That is, the voice output control unit 15 starts outputting the guide voice in response to the generation of the trigger, and starts outputting the guide voice during the recognition stage. In addition, when the voice output control unit 15 receives the response voice data before the output of the guide voice is completed, the voice output control unit 15 shifts to the output stage after the output of the guide voice is completed. This processing is the same processing as in <Case Where Processing Stage is Recognition Stage and Urgency is Medium level (See Serial Number A5 in FIG. 3)> except that the guide voice is not shortened. In this case, the reason for not shortening the guide voice is that as illustrated in the record related to the immediately preceding guide voice in FIG. 2, the sentence corresponding to the immediately preceding guide voice is a sufficiently short sentence having only the countdown remaining phrase and the maneuver phrase as phrases. Note that when a phrase that may be shortened is included in a normal sentence, the guide voice may be shortened even in this case.

<Case where Processing Stage is Output Stage and Urgency is Low Level (See Record with Serial Number A7 in FIG. 3)>

When the processing stage at the timing when the trigger is generated is the "output stage" and the urgency of the guide voice is the "low level", the voice output control unit 15 executes the following processing. That is, the voice output control unit 15 holds the output of the guide voice by the guide voice output function, and executes the interaction related processing by the voice interaction function as usual. The voice output control unit 15 executes the output of the guide voice after the interaction related processing is completed. This processing is similar to the processing of <Case where Processing Stage is Reception Stage and Urgency is Low Level (See Record with Serial Number A1 in FIG. 3)> The effect obtained by performing the processing is as described in <Case where Processing Stage is Reception Stage and Urgency is Low Level (See Record with Serial Number A1 in FIG. 3)>.

<Case where Processing Stage is Output Stage and Urgency is Medium Level (See Record with Serial Number A8 in FIG. 3)>

When the processing stage at the timing when the trigger is generated is the "output stage" and the urgency of the guide voice is the "medium level", the voice output control unit 15 executes the following processing. That is, the voice output control unit 15 holds the output of the guide voice during the output stage, and outputs the guide voice after the end of the output stage (after the output of the voice based on the response voice data is completed).

The following effects are obtained by performing the above processing in this case. That is, since the guide voice is not output at the output stage, it is possible to suppress the reduction in the listening ease of the user. In addition, since the processing has already shifted to the output stage, the time required to complete the output stage is considered to be short (the maximum time required to output the voice recorded in the response voice data), so the guide voice can be output without causing the unnecessary time lag after the trigger is generated. As described above, when the urgency of the guide voice is the medium level, a slight time lag from when the trigger is generated until the guidance is started is allowed.

<Case where Processing Stage is Output Stage and Urgency is High Level (See Record with Serial Number A9 in FIG. 3)>

When the processing stage at the timing when the trigger is generated is the "output stage" and the urgency of the guide voice is the "high level", the voice output control unit 15 executes the following processing. That is, the voice output control unit 15 interrupts the output stage (interrupts the output of the voice corresponding to the response) to output the guide voice, and resumes the output stage after the output of the guide voice is completed. After the output stage is resumed, the voice corresponding to the response may be output from the beginning, or may be output from the interrupted place.

The following effects are obtained by performing the above processing in this case. That is, it is possible to suppress the occurrence of the disadvantage to the user due to the fact that the guide voice having the high level of urgency is not immediately output. In addition, after the voice output is completed, the output stage is resumed and the user can listen to the voice corresponding to the response from the beginning or the interrupted place, so the user does not need to speak the wake word and the request again and the user convenience is high. Further, since the output stage is interrupted while the guide voice is output, the guide voice and the voice corresponding to the response are not output in a mixed manner, and the reduction in the listening ease of the user can be suppressed.

Next, the operation example of the in-vehicle device 2, in particular, details of the voice output control processing will be described using the flowchart of FIG. 5. As illustrated in FIG. 5, the voice output control unit 15 of the in-vehicle device 2 detects the wake word to start the interaction related processing and shift to the reception stage (step SA1). Thereafter, the voice output control unit 15 monitors whether or not the generation of the trigger is detected by the trigger generation detection unit 14 (step SA2), and monitors whether or not the interaction related processing is completed (step SA3). When the interaction related processing is completed without the generation of the trigger (step SA3: YES), the voice output control unit 15 ends the process.

On the other hand, if the trigger is generated before the voice output control processing is completed (step SA2: YES), the voice output control unit 15 recognizes the type of guide voice corresponding to the guide start distance, and recognizes the urgency of the guide voice (step SA4). Next, the voice output control unit 15 recognizes the processing stage at the present time (the timing when the trigger is generated) (step SA5). Next, as illustrated in FIG. 3, the voice output control unit 15 controls the output of the guide voice and the interaction voice in a manner corresponding to the combination of the urgency recognized in step SA4 and the processing stage recognized in step SA5 (step SA6).

<Modification>

Next, a modification of the above embodiment will be described. In the above embodiment, the voice output control unit 15 controls the output of the guide voice according to the combination of the processing stage when the trigger is generated and the urgency of the guide voice to be output. On the other hand, in this modification, the voice output control unit 15 does not consider the urgency of the guide voice and controls the output of the guide voice according to the processing stage. In particular, in the present embodiment, when the trigger is generated during the execution of interaction related processing, the voice output control unit 15 outputs the guide voice during the recognition stage when the processing stage of interaction related processing at the time of the generation of the trigger is before the output stage. Hereinafter, the processing of the voice output control unit 15 will be described in detail.

The voice output control unit 15 recognizes the processing stage of the interaction related processing at the present time, when the trigger generation detection unit 14 detects the generation of the trigger during the execution of the interaction related processing. At that time, the voice output control unit 15 does not recognize the urgency. Then, the voice output control unit 15 executes the following processing according to the processing stage at the present time.

When the processing stage at the present time is the reception stage, the voice output control unit 15 continues the reception stage, and holds the output of the guide voice during the reception stage. The voice output control unit 15 outputs the guide voice during the recognition stage after shifting from the reception stage to the recognition stage. At that time, the guide voice may be shortened. This processing corresponds to the processing of <Case Where Processing Stage is Reception Stage and Urgency is Medium Level (See Record with Serial Number A2 in FIG. 3)>. Since the processing is executed, it is possible to output the guide voice without causing the time lag as much as possible between the timing when the trigger is generated and the timing when the guide voice starts while suppressing the reduction in the accuracy of voice recognition and the listening ease of the user by suitably using the fact that even if the guide voice is output in the recognition stage, it does not adversely affect the accuracy of voice recognition and the listening ease of the user. It is possible to suppress the disadvantage to the user by shortening the time lag.

That is, when the processing stage at the present time is the recognition stage, the voice output control unit 15 starts outputting the guide voice at the timing when the trigger is generated, and outputs the guide voice during the recognition stage. Regarding the output of the guide voice, the shortened guide voice may be output. This processing corresponds to the processing of <Case Where Processing Stage is Recognition Stage and Urgency is Medium Level (See Record with Serial Number A5 in FIG. 3)>. Since such processing is executed, it is possible to immediately output the guide voice in response to the generation of the trigger while suppressing the reduction in the accuracy of voice recognition and the listening ease of the user by suitably using the fact that even if the guide voice is output in the recognition stage, it does not adversely affect the accuracy of voice recognition and the listening ease of the user. It is possible to suppress the disadvantage to the user by immediately outputting the guide voice in response to the generation of the trigger.

When the processing stage at the present time is the output stage, the output of the guide voice is held during the output stage, and the guide voice is output after the output stage is ended (after the voice output based on the response voice data is completed). This processing corresponds to the processing of <Case Where Processing Stage is Output Stage and Urgency is Medium Level (See Record with Serial Number A8 in FIG. 3)>. Since such processing is executed, the guide voice is not output at the output stage, so it is possible to suppress the reduction in the listening ease of the user.

When the processing stage at the present time is the output stage, the voice output control unit 15 may be configured to execute the following processing instead of the above processing. That is, the voice output control unit 15 may interrupt the output stage (interrupts the output of the voice corresponding to the response) to output the guide voice, and resumes the output stage after the output of the guide voice is completed. This processing corresponds to the processing of <Case Where Processing Stage is Output Stage and Urgency is High Level (See Record with Serial Number A9 in FIG. 3)>. After the output stage is resumed, the voice corresponding to the response may be output from the beginning, or may be output from the interrupted place. In addition, the shortened guide voice may be output. By executing such processing, it is possible to suppress the occurrence of the disadvantage to the user due to the fact that the guide voice is not immediately output. Further, since the output stage is interrupted while the guide voice is output, the guide voice and the voice corresponding to the response are not output in a mixed manner, and the reduction in the listening ease of the user can be suppressed.

Figure 6:
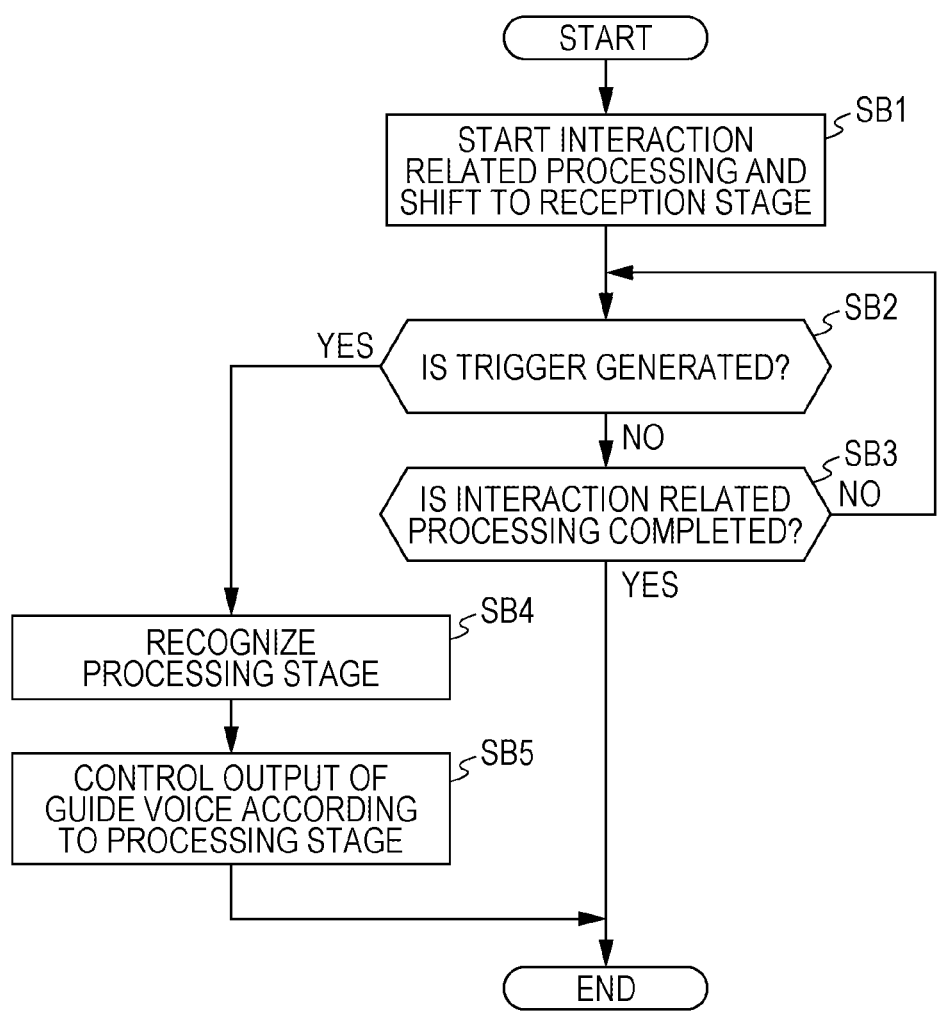
FIG. 6 is a flowchart illustrating an operation example of an in-vehicle device according to a modification of an embodiment of the present invention.

Next, the operation example of the in-vehicle device 2 according to this modification will be described using the flowchart of FIG. 6. As illustrated in FIG. 6, the voice output control unit 15 of the in-vehicle device 2 detects the wake word to start the voice output control processing and shift to the reception stage (step SB1). Thereafter, the voice output control unit 15 monitors whether or not the generation of the trigger is detected by the trigger generation detection unit 14 (step SB2), and monitors whether or not the voice output control processing is completed (step SB3). When the voice output control processing is completed without the generation of the trigger (step SB3: YES), the voice output control unit 15 ends the process.

On the other hand, when the trigger is generated before the voice output control processing is completed (step SB2: YES), the voice output control unit 15 recognizes the processing stage at the present time (the timing when the trigger is generated) (step SB4). Next, the voice output control unit 15 controls the output of the guide voice in a manner corresponding to the combination with the processing stage recognized at step SB4 (step SB5).

As described above, in this modification, when the trigger outputting the guide voice is generated during the execution of interaction related processing, the voice output control unit 15 controls the output of the guide voice according to the processing stage of the interaction related processing at the time of the generation of the trigger. According to this configuration, it is possible to dynamically control the output of the guide voice according to whether or not the processing stage is the stage that does not affect the accuracy of voice recognition and the listening difficulty of the user even if the guide voice is output, and similarly to the embodiment, it is possible to suppress the disadvantage to the user due to the fact that the guide voice is not output at all during the execution of the interaction related processing and suppress the reduction in the accuracy of voice recognition and the listening ease of the user.

The above embodiments are merely examples of implementation in carrying out the present invention, and the present invention can be implemented in various forms.

For example, in the above embodiment, three levels of urgency may be available, but two levels of urgency may be available. In this case, for example, it is possible to cope with "when the urgency is the lower level of the two levels, the processing executed in each processing stage is executed when the urgency is the medium level in the above embodiment, and when the urgency is the higher level of the two levels, the processing executed in each processing stage is executed when the urgency is the high level in the above embodiment", "when the urgency is the lower level of the two levels, the processing executed in each processing stage is executed when the urgency is the low level in the above embodiment, and when the urgency is the higher level of the two levels, the processing executed in each processing stage is executed when the urgency is the high level in the above embodiment", and "when the urgency is the lower level of the two levels, the processing executed in each processing stage is executed when the urgency is the low level in the above embodiment, and when the urgency is the higher level of the two levels, the processing executed in each processing stage is executed when the urgency is the medium level in the above embodiment".

In addition, in the above embodiment, the contents of one processing according to the combination of the processing stage and the urgency may be changed without deviating from the scope of the present invention. As an example, in the above embodiment, in the case where the processing stage is the reception stage and the urgency is the medium level, instead of the processing (see the "processing contents" field for the record with serial number A2 in FIG. 3) that is executed in this case, the processing (see the "processing contents" field for the record with serial number A3 in FIG. 3) that is executed in the case where the processing stage is the reception stage and the urgency is the high level may be executed.

In addition, in the above embodiment, only the guide voice of the guidance related to the guide intersection that is output according to the separation distance between the host vehicle position and the guide intersection is exemplified as the guide voice, which is very simplified for clarity of explanation. The guide voice may be the vehicle related guide voice that is output in response to some trigger. As an example, the guide voice to which the present invention is applied may include guide voice for toll booth guidance, guide voice for ETC lane guide, guide voice for VICS (registered trademark) information, and the like.

In addition, in the above embodiment, the in-vehicle device 2 may be configured to execute a part or all of the processing executed by the service providing server 3. In addition, the service providing server 3 (may be an external device other than the service providing server 3) may be configured to execute a part or all of the processing performed by the in-vehicle device 2.

In addition, in the above embodiment, the in-vehicle device 2 of the guide voice output control system 1 is configured to execute the processing of outputting the guide voice and the interaction voice processing. In this regard, the configuration of executing various types of processing by installing (including a state temporarily installed) a smart speaker in the host vehicle and linking the smart speaker with the in-vehicle device such as a navigation device may be possible. Note that the smart speaker may be a device having a function as a smart speaker.

Figure 7:
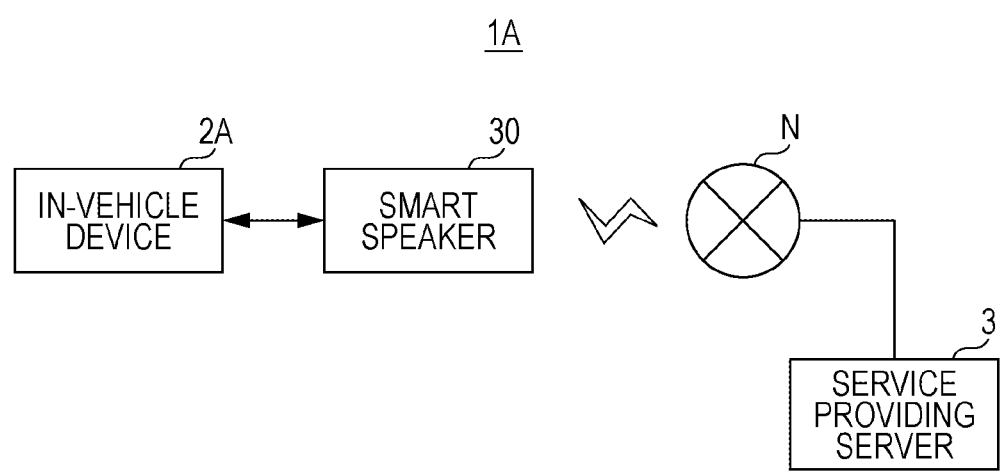
FIG. 7 is a diagram illustrating another example of a configuration of the guide voice output control system.

FIG. 7 is a diagram illustrating a configuration example of a voice output control system 1A when a smart speaker is used. The voice output control system 1A illustrated in FIG. 7 is configured to include an in-vehicle device 2A and a smart speaker 30. The smart speaker 30 can communicate with the service providing server 3 via the network N. The smart speaker 30 accesses the network N by using the tethering function of the portable terminal or accesses the network N by directly accessing the mobile communication network. The smart speaker 30 and the in-vehicle device 2A are communicably connected by a predetermined communication protocol in a wired or wireless manner. In the case of the configuration illustrated in FIG. 7, the smart speaker 30 and the in-vehicle device 2A cooperate to realize the function of the voice output control unit 15 of the above embodiment.

In the example of FIG. 7, the smart speaker 30 and the in-vehicle device 2A both may be configured to access the network N, and furthermore, the in-vehicle device 2A can access the network N and the smart speaker 30 may be communicably connected to the in-vehicle device 2A.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A guide voice output control system, comprising a processor operating a program stored in a recording medium to realize:
   a trigger generation detection unit configured to detect that a trigger outputting guide voice related to vehicle travel is generated; and
   a voice output control unit configured to have a function of outputting the guide voice corresponding to the detected trigger when it is detected that the trigger is generated by the trigger generation detection unit and a function of outputting voice of contents corresponding to contents of voice spoken by a user onboard a vehicle by executing interaction related processing having a reception stage for receiving input voice as a target of voice recognition, a recognition stage for recognizing voice, and an output stage for outputting voice based on a recognition result;
   wherein the voice output control unit controls the timing and contents of the output of the guide voice according to a processing stage of the interaction related processing at the time of the generation of the trigger when the trigger is generated during the execution of one of the reception stage, the recognition stage and the output stage of the interaction related processing;
   wherein when the trigger is generated during the execution of the interaction related processing, the voice output control unit outputs the guide voice during the recognition stage when the processing stage of the interaction related processing at the time of the generation of the trigger is before the output stage; and
   wherein the voice output control unit outputs the guide voice shortened in a predetermined manner during the recognition stage.

2. A guide voice output control system, comprising a processor operating a program stored in a recording medium to realize:
   a trigger generation detection unit configured to detect that a trigger outputting guide voice related to vehicle travel is generated; and
   a voice output control unit configured to have a function of outputting the guide voice corresponding to the detected trigger when it is detected that the trigger is generated by the trigger generation detection unit and a function of outputting voice of contents corresponding to contents of voice spoken by a user onboard a vehicle by executing interaction related processing having a reception stage for receiving input voice as a target of voice recognition, a recognition stage for recognizing voice, and an output stage for outputting voice based on a recognition result;
   wherein when the trigger is generated during the execution of one of the reception stage, the recognition stage and the output stage of the interaction related processing, the voice output control unit controls the output of the guide voice according to the processing stage of the interaction related processing at the time of the generation of the trigger and an urgency of the guide voice corresponding to the trigger; and
   wherein when the trigger at the time of the reception stage is generated, the voice output control unit is configured to
      output the guide voice after the interaction related processing which is being executed is completed when the urgency of the guide voice corresponding to the trigger is a low level,
      hold the output of the guide voice during the reception stage and outputs the guide voice during the recognition stage when the urgency of the guide voice corresponding to the trigger is a medium level higher than the low level, and
      output the guide voice by interrupting the reception stage and resumes the reception stage after the output of the guide voice is completed when the urgency of the guide voice corresponding to the trigger is a high level higher than the medium level.

3. The guide voice output control system according to claim 2, wherein when the trigger at the time of the recognition stage is generated, the voice output control unit
   outputs the guide voice after the interaction related processing which is being executed is completed when the urgency of the guide voice corresponding to the trigger is lower than a predetermined level, and
   outputs the guide voice during the recognition stage when the urgency of the guide voice corresponding to the trigger is the predetermined level or higher.

4. The guide voice output control system according to claim 2, wherein when the urgency of the guide voice corresponding to the trigger generated during the execution of the interaction related processing is lower than a predetermined level, the voice output control unit outputs the guide voice after the interaction related processing which is being executed is completed regardless of the processing stage of the interaction related processing at the time of the generation of the trigger.

5. The guide voice output control system according to claim 2, wherein when the urgency of the guide voice corresponding to the trigger generated during the execution of the interaction related processing is a predetermined level or higher, the voice output control unit holds the output of the guide voice during the reception stage and outputs the guide voice during the recognition stage when the processing stage of the interaction related processing at the time of the generation of the trigger is the reception stage.

6. The guide voice output control system according to claim 5, wherein the voice output control unit outputs the guide voice shortened in a predetermined manner during the recognition stage.

7. The guide voice output control system according to claim 2, wherein when the urgency of the guide voice corresponding to the trigger generated during the execution of the interaction related processing is a predetermined level or higher, the voice output control unit outputs the guide voice during the recognition stage when the processing stage of the interaction related processing at the time of the generation of the trigger is the recognition stage.

8. The guide voice output control system according to claim 7, wherein the voice output control unit outputs the guide voice shortened in a predetermined manner during the recognition stage.

9. The guide voice output control system according to claim 8, wherein the voice output control unit shifts to the output stage after holding the shift to the output stage and completing the output of the voice when the output of the guide voice is not completed during the recognition stage.

10. The guide voice output control system according to claim 2, wherein when the urgency of the guide voice corresponding to the trigger generated during the execution of the interaction related processing is a predetermined level or higher, the voice output control unit holds the output of the guide voice during the output stage and outputs the guide voice after an end of the output stage when the processing stage of the interaction related processing at the time of the generation of the trigger is the output stage.

11. The guide voice output control system according to claim 2, wherein when the urgency of the guide voice corresponding to the trigger generated during the execution of the interaction related processing is a predetermined level or higher, the voice output control unit outputs the guide voice by interrupting the reception stage and resumes the reception stage after the output of the voice is completed when the processing stage of the interaction related processing at the time of the generation of the trigger is the reception stage.

12. The guide voice output control system according to claim 2, wherein when the urgency of the guide voice corresponding to the trigger generated during the execution of the interaction related processing is a predetermined level or higher, the voice output control unit outputs the guide voice by interrupting the output stage and resumes the output stage after the output of the guide voice is completed when the processing stage of the interaction related processing at the time of the generation of the trigger is the output stage.

13. A guide voice output control system, comprising a processor operating a program stored in a recording medium to realize:
   a trigger generation detection unit configured to detect that a trigger outputting guide voice related to vehicle travel is generated; and
   a voice output control unit configured to have a function of outputting the guide voice corresponding to the detected trigger when it is detected that the trigger is generated by the trigger generation detection unit and a function of outputting voice of contents corresponding to contents of voice spoken by a user onboard a vehicle by executing interaction related processing having a reception stage for receiving input voice as a target of voice recognition, a recognition stage for recognizing voice, and an output stage for outputting voice based on a recognition result;
   wherein when the trigger is generated during the execution of one of the reception stage, the recognition stage and the output stage of the interaction related processing, the voice output control unit controls the output of the guide voice according to the processing stage of the interaction related processing at the time of the generation of the trigger and an urgency of the guide voice corresponding to the trigger;
   wherein when the trigger at the time of the output stage is generated, the voice output control unit is configured to:
      output the guide voice after the interaction related processing which is being executed is completed when the urgency of the guide voice corresponding to the trigger is a low level,
      hold the output of the guide voice during the output stage and outputs the guide voice after an end of the output stage when the urgency of the guide voice corresponding to the trigger is a medium level higher than the low level, and
      output the guide voice by interrupting the output stage and resumes the output stage after the output of the guide voice is completed when the urgency of the guide voice corresponding to the trigger is a high level higher than the medium level.

* * * * *